United States Patent
Lee

(10) Patent No.: US 12,381,242 B2
(45) Date of Patent: Aug. 5, 2025

(54) DEVICE FOR TREATING EXHAUST GAS FROM FUEL CELL

(71) Applicants: Hyundai Motor Company, Seoul (KR); Kia Corporation, Seoul (KR)

(72) Inventor: Sang Kyu Lee, Suwon-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 18/639,516

(22) Filed: Apr. 18, 2024

(65) Prior Publication Data

US 2024/0266569 A1 Aug. 8, 2024

Related U.S. Application Data

(63) Continuation of application No. 17/400,708, filed on Aug. 12, 2021, now Pat. No. 12,003,009.

(30) Foreign Application Priority Data

Feb. 10, 2021 (KR) ........................ 10-2021-0019493

(51) Int. Cl.
*H01M 8/0662* (2016.01)
*B01F 23/10* (2022.01)
*B01F 25/313* (2022.01)

(52) U.S. Cl.
CPC .......... *H01M 8/0662* (2013.01); *B01F 23/19* (2022.01); *B01F 25/31331* (2022.01); *B01F 25/31332* (2022.01)

(58) Field of Classification Search
CPC . H01M 8/0662; B01F 23/19; B01F 25/31331; B01F 25/31332; B01F 25/3142; B01F 25/31421; B01F 25/31424; B01F 25/31412; B01F 25/31425
See application file for complete search history.

(56) References Cited

U.S. PATENT DOCUMENTS

| | | |
|---|---|---|
| 2003/0031970 A1 | 2/2003 | Shimada et al. |
| 2007/0053237 A1 | 3/2007 | Yoshida |
| 2013/0188440 A1 | 7/2013 | Tabikh et al. |
| 2013/0199647 A1 | 8/2013 | Tabikh et al. |
| 2017/0263962 A1 | 9/2017 | Koo et al. |

FOREIGN PATENT DOCUMENTS

| | | |
|---|---|---|
| JP | 2002-138825 A | 5/2002 |
| JP | 2003-053148 A | 2/2003 |
| JP | 2005-073463 A | 3/2005 |
| JP | 2005-347006 A | 12/2005 |
| JP | 2006-344476 A | 12/2006 |

(Continued)

*Primary Examiner* — Basia A Ridley
*Assistant Examiner* — Heng M. Chan
(74) *Attorney, Agent, or Firm* — Morgan, Lewis & Bockius LLP

(57) ABSTRACT

The present invention relates to a device configured for treating an exhaust gas from a fuel cell, the device including: a tube member discharging an exhaust gas from a fuel cell stack; a gas guide portion provided in a tube member and configured to guide a target gas contained in the exhaust gas to the outside of the tube member; and a guide tube spaced from the gas guide portion and provided to cover the gas guide portion such that it is possible to obtain an advantageous effect of effectively reducing a concentration of the target gas in the exhaust gas discharged from the fuel cell.

12 Claims, 15 Drawing Sheets

(56) References Cited

FOREIGN PATENT DOCUMENTS

| JP | 2009-170209 A | 7/2009 |
| JP | 2009-277670 A | 11/2009 |
| JP | 2010-267556 A | 11/2010 |
| KR | 10-0773595 B | 11/2007 |
| KR | 10-1637688 B | 7/2016 |
| KR | 10-1916051 B | 11/2018 |
| KR | 10-2016441 B | 8/2019 |

DEVICE FOR TREATING EXHAUST GAS FROM FUEL CELL

CROSS-REFERENCE TO RELATED APPLICATION

The present application is a continuation application of U.S. patent application Ser. No. 17/400,708, filed Aug. 12, 2021, which claims priority to Korean Patent Application No. 10-2021-0019493 filed on Feb. 10, 2021, the entire contents of which is incorporated herein for all purposes by this reference.

BACKGROUND OF THE INVENTION

Field of the Invention

The present invention relates to a device for treating an exhaust gas from a fuel cell, and more particularly, to a device for treating an exhaust gas from a fuel cell, the device being configured for reducing a concentration of a target gas contained in an exhaust gas discharged from a fuel cell.

Description of Related Art

A fuel cell system refers to a system that continuously produces electrical energy by a chemical reaction of continuously supplied fuel. Research and development are consistently performed on the fuel cell system as an alternative capable of solving global environmental issues.

Based on types of electrolytes used for the fuel cell system, the fuel cell system may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), a direct methanol fuel cell (DMFC), and the like. Based on operating temperatures, output ranges, and the like as well as types of used fuel, the fuel cell systems may be applied to various application fields related to mobile power, transportation, distributed power generation, and the like.

Among the fuel cells, the polymer electrolyte membrane fuel cell is applied to the field of a hydrogen vehicle (hydrogen fuel cell vehicle) being developed to substitute for an internal combustion engine.

The hydrogen vehicle includes a fuel cell stack that produces electricity through an oxidation-reduction reaction between hydrogen ($H_2$) and oxygen ($O_2$). The hydrogen vehicle is configured to travel as a motor is operated by electricity produced by the fuel cell stack.

Meanwhile, hydrogen may be contained in an exhaust gas discharged from a fuel cell (e.g., an exhaust gas discharged at the time of initially starting the fuel cell). When a concentration of hydrogen in the exhaust gas is increased to a certain level, a risk of explosion is increased. Accordingly, regulations stipulate that a concentration of hydrogen in the exhaust gas from the fuel cell may be at a predetermined level or lower.

As one of the methods of reducing the concentration of hydrogen in the exhaust gas from the fuel cell, there has been provided a method of reducing a concentration of residual hydrogen in the fuel cell (e.g., a concentration of hydrogen remaining in the fuel cell when the fuel cell does not operate) or reducing a supply rate of air to be supplied to the fuel cell.

However, if a concentration of residual hydrogen in the fuel cell is decreased to a certain level or lower, there is a problem in that oxidation occurs in the fuel cell, which causes a deterioration in durability. Furthermore, if the supply rate of air to be supplied to the fuel cell is decreased, there is a problem in that it is difficult to ensure a rapid increase in output of the fuel cell.

As other methods of reducing the concentration of hydrogen in the exhaust gas from the fuel cell, there have been provided a method of filtering out hydrogen from the exhaust gas from the fuel cell using a separate filter and a method of forcibly supplying air into an exhaust pipe through which the exhaust gas from the fuel cell is discharged.

However, an expensive filter or fan (air supply fan) needs to be additionally provided to filter out hydrogen from the exhaust gas from the fuel cell or forcibly supply air into the exhaust pipe, which causes problems of an increase in costs, a complicated structure, and deteriorations in degree of design freedom and spatial utilization.

Therefore, recently, various types of research are conducted to simplify a structure while effectively reducing a concentration of hydrogen in an exhaust gas discharged from a fuel cell, but the research result is still insufficient. Accordingly, there is a demand for development of a device for treating an exhaust gas from a fuel cell.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a device configured for treating an exhaust gas from a fuel cell, the device being configured for reducing a concentration a target gas in an exhaust gas discharged from the fuel cell.

The present invention, in various aspects, has also been made in an effort to reduce a concentration of hydrogen in an exhaust gas discharged from a fuel cell.

The present invention, in various aspects, has also been made in an effort to simplify a structure and improve spatial utilization and a degree of design freedom.

The present invention, in various aspects, has also been made in an effort to improve safety and reliability.

The present invention, in various aspects, has also been made in an effort to simplify a manufacturing process and reduce costs.

The present invention, in various aspects, has also been made in an effort to ensure durability of a fuel cell and prolong a lifespan.

The object to be achieved by the exemplary embodiment is not limited to the above-mentioned objects, but also includes objects or effects which may be recognized from the solutions or the exemplary embodiments described below.

Various aspects of the present invention provide a device configured for treating an exhaust gas from a fuel cell, the device including: a tube member discharging an exhaust gas from a fuel cell stack; a gas guide portion provided in the tube member and configured to guide a target gas contained in the exhaust gas to the outside of the tube member; and a guide tube spaced from the gas guide portion with a gap and provided to cover the gas guide portion.

This is to reduce a concentration of the target gas (e.g., hydrogen) in the exhaust gas discharged from the fuel cell.

That is, hydrogen may be contained in an exhaust gas discharged from a fuel cell (e.g., an exhaust gas discharged at the time of initially starting the fuel cell). When a concentration of hydrogen in the exhaust gas is increased to a certain level, a risk of explosion is increased. Accordingly, a concentration of hydrogen in the exhaust gas from the fuel cell needs to be maintained at a predetermined level or lower.

As a method of reducing the concentration of hydrogen in the exhaust gas from the fuel cell, there has been provided a method of reducing a concentration of residual hydrogen in the fuel cell (e.g., a concentration of hydrogen remaining in the fuel cell when the fuel cell does not operate) or reducing a supply rate of air to be supplied to the fuel cell. However, if a concentration of residual hydrogen in the fuel cell is decreased to a certain level or lower, there is a problem in that oxidation occurs in the fuel cell, which causes a deterioration in durability. Furthermore, if the supply rate of air to be supplied to the fuel cell is decreased, there is a problem in that it is difficult to ensure a rapid increase in output of the fuel cell.

In addition, generally, as other methods of reducing the concentration of hydrogen in the exhaust gas from the fuel cell, there have been provided a method of filtering out hydrogen from the exhaust gas from the fuel cell using a separate filter and a method of forcibly supplying air into an exhaust pipe through which the exhaust gas from the fuel cell is discharged. However, an expensive filter or fan (air supply fan) needs to be additionally provided to filter out hydrogen from the exhaust gas from the fuel cell or forcibly supply air into the exhaust pipe, which causes problems of an increase in costs, a complicated structure, and deteriorations in degree of design freedom and spatial utilization.

However, according to the exemplary embodiment of the present invention, a part of the target gas contained in the exhaust gas is discharged in advance through the gas guide portion before the exhaust gas is discharged from the outlet (distal end) of the tube member, and as a result, it is possible to obtain an advantageous effect of reducing the concentration of the target gas in the exhaust gas discharged to the outlet of the tube member.

Among other things, according to the exemplary embodiment of the present invention, since the hydrogen contained in the exhaust gas is discharged in advance through the gas guide portion, it is possible to obtain an advantageous effect of considerably reducing the concentration of the hydrogen in the exhaust gas discharged to the outlet of the tube member.

The tube member may have various structures configured for discharging the exhaust gas.

For example, the tube member may include a first tube, and a second tube provided to be spaced from the first tube with a gap, and a gas guide slot may be defined between the first tube and the second tube.

According to the exemplary embodiment of the present invention, the first tube and the second tube may be provided to have an equal diameter. Furthermore, the first tube and the second tube may be disposed coaxially to each other.

The gas guide portion may have various structures configured for guiding the target gas to the outside of the tube member.

The gas guide portion may be provided to be spaced from a distal end portion of the tube member.

For example, the gas guide portion may include the gas guide slot continuously formed in a circumferential direction of the tube member.

The guide tube is provided to reduce the concentration of the target gas (e.g., hydrogen) guided (discharged) to the outside of the tube member through the gas guide portion.

That is, the concentration of hydrogen in the exhaust gas discharged to the outlet of the tube member may be reduced by the gas guide portion provided in the tube member, but because the comparatively high-concentration hydrogen is discharged through the gas guide portion, there is a problem in that a risk of explosion of hydrogen may be increased in the vicinity of the gas guide portion.

However, according to the exemplary embodiment of the present invention, since the guide tube is provided outside the tube member (outside the gas guide part) and the hydrogen and the outside air may be mixed by the guide tube, it is possible to obtain an advantageous effect of reducing the concentration of hydrogen in the vicinity of the gas guide portion and reducing a risk of explosion.

A mixing space fluidically-communicating with the outside of the tube member is defined between the gas guide portion and the guide tube, and the target gas and the outside air may be mixed in the mixing space.

first and second distal end portions of the mixing space in a longitudinal direction of the tube member may fluidically communicate with the outside.

The guide tube may have various structures configured for defining the mixing space in which the hydrogen and the outside air may be mixed.

According to the exemplary embodiment of the present invention, the guide tube may include a guide ring, and the guide ring may be provided to surround the entire gas guide slot.

According to the exemplary embodiment of the present invention, the first tube and the second tube may be formed to have different diameters.

For example, the first tube may be provided to have a first diameter, and the second tube may be provided to have a second diameter different from the first diameter.

According to the exemplary embodiment of the present invention, the first tube and the second tube may be disposed non-coaxially to each other.

According to the exemplary embodiment of the present invention, the guide tube may be disposed to be inclined with respect to the tube member.

According to the exemplary embodiment of the present invention, the guide tube may include: a first guide tube portion provided to surround the first tube and having a diameter that decreases from a first inlet to a first outlet; of the first guide tube portion and a second guide tube portion provided to surround the second tube and having a diameter that increases to a second outlet from a second inlet connected to the first outlet.

According to the exemplary embodiment of the present invention, the gas guide portion may include at least a gas guide hole penetratively formed in the tube member.

The at least a gas guide hole may be formed in at least any one of upper and lower portions of the tube member in an upward direction or a downward direction thereof.

According to the exemplary embodiment of the present invention, the guide tube may include a guide plate, and the guide plate may be provided to cover a periphery of the at least a gas guide hole (partially cover the periphery of the tube member).

The guide plate may have various structures configured for defining the mixing space in which the hydrogen and the outside air may be mixed.

For example, the guide plate may be formed in a straight shape configured for partially covering the periphery of the tube member.

According to various exemplary embodiments of the present invention, the guide plate may be formed in a curved shape. For example, the guide plate may include a crest portion and a trough portion repeatedly connected to each other to define a waveform.

The target gas may be variously changed in accordance with required conditions and design specifications. According to the exemplary embodiment of the present invention, the target gas may include hydrogen ($H_2$).

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
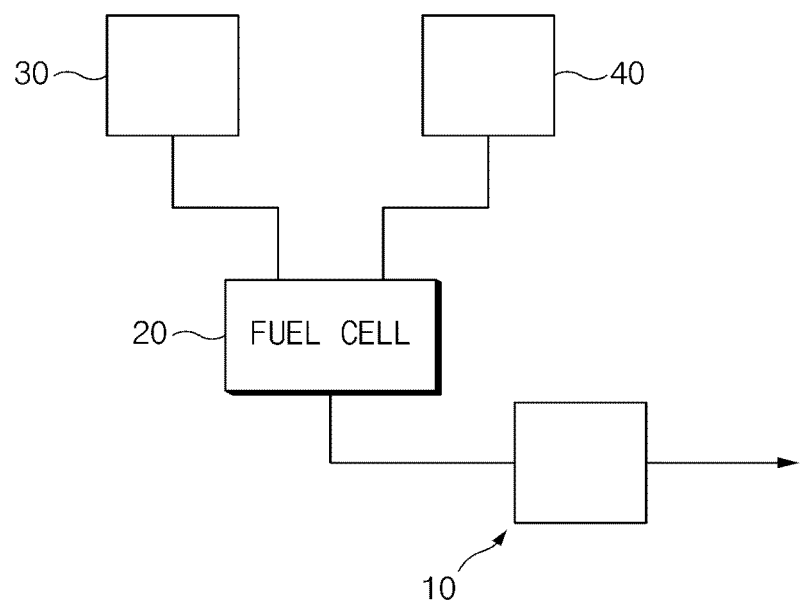
FIG. 1 is a view for explaining an example in which a device configured for treating an exhaust gas from a fuel cell according to various exemplary embodiments of the present invention is applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying drawings.

However, the technical spirit of the present invention is not limited to various exemplary embodiments described herein but may be implemented in various different forms. One or more of the constituent elements in the exemplary embodiments may be selectively combined and substituted within the scope of the technical spirit of the present invention.

Furthermore, unless otherwise specifically and explicitly defined and stated, the terms (including technical and scientific terms) used in the exemplary embodiments of the present invention may be construed as the meaning which may be commonly understood by the person with ordinary skill in the art to which various exemplary embodiments of the present invention pertains. The meanings of the commonly used terms such as the terms defined in dictionaries may be interpreted in consideration of the contextual meanings of the related technology.

Furthermore, the terms used in the exemplary embodiment of the present invention are for explaining the embodiments, not for limiting the present invention.

Unless stated otherwise in the context of the exemplary embodiment, a singular form may also include a plural form. The explanation "at least one (or one or more) of A, B, and C" described herein may include one or more of all combinations that may be made by combining A, B, and C.

Furthermore, the terms such as first, second, A, B, (a), and (b) may be used to describe constituent elements of the exemplary embodiments of the present invention.

These terms are used only for discriminating one constituent element from another constituent element, and the nature, the sequences, or the orders of the constituent elements are not limited by the terms.

Furthermore, when one constituent element is described as being 'connected', 'coupled', or 'attached' to another constituent element, one constituent element can be connected, coupled, or attached directly to another constituent element or connected, coupled, or attached to another constituent element through yet another constituent element interposed therebetween.

Furthermore, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. Furthermore, the expression "above (on) or below (under)" may include a meaning of a downward direction as well as an upward direction based on one constituent element.

Referring to FIGS. 1 to 15, a device 10 for treating an exhaust gas from a fuel cell according to the exemplary embodiment of the present invention includes a tube member 100 configured to discharge an exhaust gas EG from a fuel cell stack 20, a gas guide portion 200 provided in the tube member 100 and configured to guide a target gas TG contained in the exhaust gas EG to the outside of the tube member 100, and a guide tube 300 spaced from the gas guide portion 200 and provided to cover the gas guide portion 200.

For reference, the device 10 for treating an exhaust gas from a fuel cell according to the exemplary embodiment of the present invention may be applied to treat exhaust gas EG discharged from a fuel cell system applied to mobility vehicles such as automobiles, ships, and airplanes. However, the present invention is not restricted or limited by types and properties of subjects (mobility vehicles) to which the device 10 for treating an exhaust gas from a fuel cell is applied.

Hereinafter, an example in which the device 10 for treating an exhaust gas from a fuel cell according to the exemplary embodiment of the present invention treats the exhaust gas EG discharged from the fuel cell stack 20 applied to environmentally friendly vehicles such as hybrid vehicles or electric vehicles that obtain driving power from electrical energy will be described.

The fuel cell stack 20 may have various structures configured for producing electricity from an oxidation-reduction reaction between hydrogen supplied from a hydrogen supply portion 40 and air supplied from an air supply portion 30.

As an example, the fuel cell stack 20 includes: a membrane electrode assembly (MEA) having catalyst electrode layers, in which electrochemical reactions occur, attached at both sides of an electrolyte membrane through which hydrogen ions move; gas diffusion layers (GDLs) configured to uniformly distribute reactant gases and transfer generated electrical energy; a gasket and a fastener configured to maintain sealability for the reactant gases and a coolant and maintain an appropriate fastening pressure; and separators (bipolar plates) configured to move the reactant gases and the coolant.

In the fuel cell stack 20, hydrogen, which is fuel, and air (oxygen), which is an oxidant, are supplied to an anode and a cathode of the membrane electrode assembly, respectively, through flow paths in the separators such that the hydrogen is supplied to the anode, and the air is supplied to the cathode.

The hydrogen supplied to the anode is decomposed into hydrogen ions (protons) and electrons by catalysts in the electrode layers provided at both sides of the electrolyte membrane. Only the hydrogen ions are selectively transmitted to the cathode through the electrolyte membrane, which is a cation exchange membrane, and at the same time, the electrons are transmitted to the cathode through the gas diffusion layer and the separator which are conductors.

At the cathode, the hydrogen ions supplied through the electrolyte membrane and the electrons delivered through the separator meet oxygen in the air supplied to the cathode by an air supply device, generating a reaction of producing water. As a result of the movement of the hydrogen ions, the electrons flow through external conductive wires, and an electric current is produced as a result of the flow of the electrons.

Figure 2:
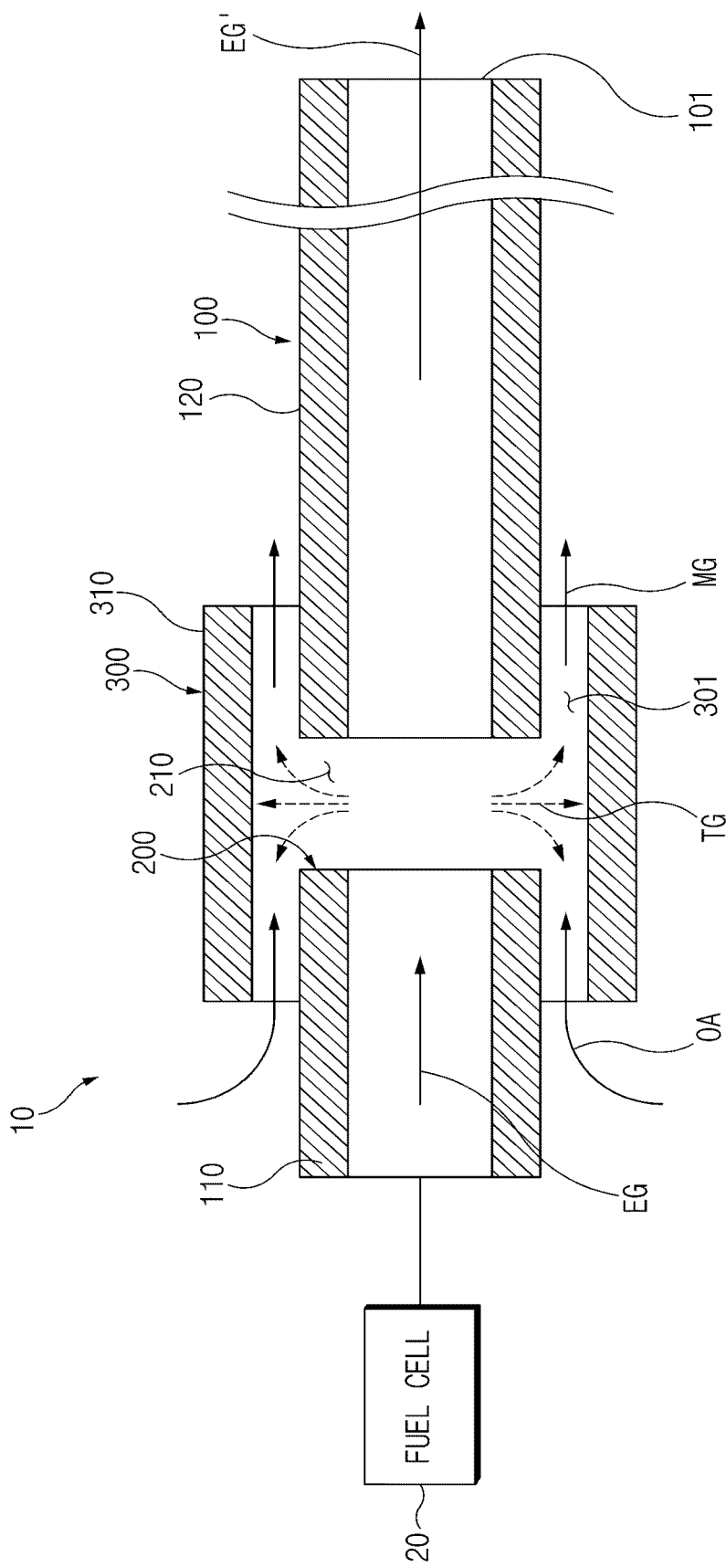
FIG. 2 is a view for explaining the device configured for treating an exhaust gas from a fuel cell according to the exemplary embodiment of the present invention.
Figure 3:
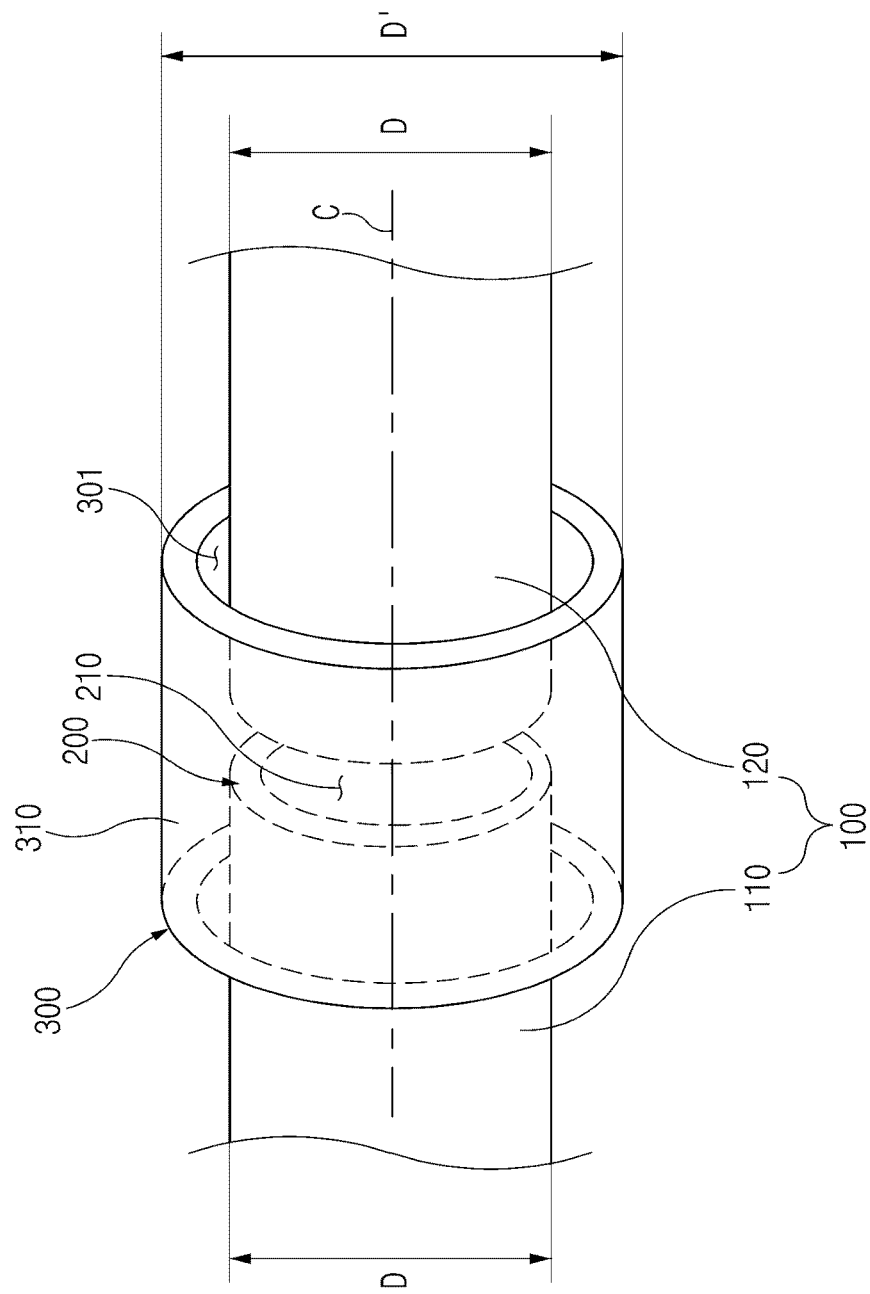
FIG. 3 is a view for explaining a gas guide slot and a guide ring of the device configured for treating an exhaust gas from a fuel cell according to the exemplary embodiment of the present invention.

Referring to FIG. 2 and FIG. 3, the tube member 100 is provided to discharge the exhaust gas EG, which is discharged from the fuel cell stack 20, to the outside.

The tube member 100 may have various structures configured for discharging the exhaust gas EG, and the present invention is not restricted or limited by the structure of the tube member 100.

For example, the tube member 100 may include a first tube 110, and a second tube 120 provided to be spaced from the first tube 110.

For example, each of the first tube 110 and the second tube 120 may have a circular cross section having a uniform size, as a whole. According to another exemplary embodiment the present invention, each of the first tube 110 and the second tube 120 may have a quadrangular cross section or other cross-sectional shapes. Otherwise, an enlarged outlet having an enlarged cross-sectional area may be provided at an outlet end portion of the tube member 100.

According to the exemplary embodiment of the present invention, the first tube 110 and the second tube 120 may be provided to have an equal diameter D. Furthermore, the first tube 110 and the second tube 120 may be coaxially disposed to have the same center C.

The gas guide portion 200 is provided in the tube member 100 to guide the target gas TG contained in the exhaust gas EG to the outside of the tube member 100.

The target gas TG may be variously changed in accordance with required conditions and design specifications, and the present invention is not restricted or limited by types and properties of the target gas TG. The target gas TG may include hydrogen ($H_2$).

The gas guide portion 200 is provided to reduce a concentration of hydrogen contained in the exhaust gas EG discharged to the outlet of the tube member 100 to meet a condition defined by regulations.

That is, a concentration of residual hydrogen in the fuel cell stack needs to be maintained at a predetermined level or higher to inhibit oxidation in the fuel cell stack when the fuel cell stack does not operate. However, when the fuel cell stack begins to operate when the concentration of residual hydrogen in the fuel cell stack is maintained at a predetermined level or higher, the hydrogen remaining in the fuel cell stack is discharged at once, which causes a problem in that the concentration of hydrogen contained in the exhaust gas is rapidly increased.

However, according to the exemplary embodiment of the present invention, a part of the hydrogen contained in the exhaust gas EG is discharged in advance through the gas guide portion 200 before the exhaust gas EG is discharged from the outlet (distal end) of the tube member 100, and as a result, it is possible to reduce a concentration of hydrogen in an exhaust gas EG' finally discharged from the outlet of the tube member 100.

This is based on the fact that the hydrogen contained in the exhaust gas EG is lighter in weight and has higher diffusibility than other gases (e.g., air) contained in the exhaust gas EG. Since the gas guide portion 200 is provided in the tube member 100, a part of the hydrogen contained in the exhaust gas EG may be discharged in advance through the gas guide portion 200 (only the hydrogen in the exhaust gas may be concentratedly discharged), and as a result, it is possible to obtain an advantageous effect of reducing a concentration of hydrogen in the exhaust gas EG' finally discharged to the outlet of the tube member 100.

The gas guide portion 200 may have various structures configured for guiding the target gas TG (e.g., hydrogen) to the outside of the tube member 100, and the present invention is not restricted or limited by the structure and the shape of the gas guide portion 200.

The gas guide portion 200 may be provided to be spaced from a distal end portion 101 of the tube member 100 at a predetermined distance.

For example, the gas guide portion 200 may include a gas guide slot 210 continuously formed in a circumferential direction of the tube member 100.

The gas guide slot 210 may be provided in a form of a ring corresponding to a space between the first tube 110 and the second tube 120 spaced from each other.

The guide tube 300 may be spaced from the gas guide portion 200 and provided to cover the gas guide portion 200.

The guide tube 300 is provided to reduce a concentration of (diffuse) the target gas TG (e.g., hydrogen) guided (discharged) to the outside of the tube member 100 through the gas guide portion 200.

That is, the concentration of hydrogen in the exhaust gas EG discharged to the outlet of the tube member 100 may be reduced by the gas guide portion 200 provided in the tube member 100, but because the high-concentration hydrogen with straightness is discharged through the gas guide portion 200, a risk of explosion of hydrogen may be increased in the vicinity of the gas guide portion 200.

However, according to the exemplary embodiment of the present invention, since the guide tube 300 is provided outside the tube member 100 (outside the gas guide part), the hydrogen discharged to the outside of the tube member 100 may be effectively diffused by being mixed with outside air OA after colliding with the guide tube 300. As a result, it is possible to obtain an advantageous effect of reducing a concentration of hydrogen in the vicinity of the gas guide portion 200 and thus reducing a risk of explosion.

A mixing space 301 fluidically-communicating with the outside of the tube member is defined between the gas guide portion 200 and the guide tube 300, and the target gas TG and the outside air OA may be mixed in the mixing space 301.

For reference, in the exemplary embodiment of the present invention, the mixing space 301 may be defined as an opened space or region in which the target gas TG (hydrogen) discharged from the gas guide portion 200 may be mixed with the outside air OA.

First and second distal end portions of the mixing space 301 in the longitudinal direction of the tube member 100 may fluidically communicate with the outside. For example, the outside air OA may be introduced into one end portion (a left end portion based on FIG. 2) of the mixing space 301, the hydrogen discharged through the gas guide portion 200 may be mixed with the outside air OA in the mixing space 301 after colliding with an internal surface of the guide tube 300, and a gas mixture MG made by mixing the hydrogen and the outside air OA may be discharged to the outside of the guide tube 300 through the other end portion (a right end portion based on FIG. 2) of the mixing space 301.

The guide tube 300 may have various structures configured for defining the mixing space 301 in which the hydrogen and the outside air OA may be mixed, and the present invention is not restricted or limited by the structure and the shape of the guide tube 300.

According to the exemplary embodiment of the present invention, the guide tube 300 may include a guide ring 310, and the guide ring 310 may be provided to surround the entire gas guide slot 210.

For example, the guide ring 310 may be formed in a hollow cylindrical shape having a diameter D' greater than a diameter D of the tube member 100 (the first tube and the second tube) (the guide ring 310 having an internal diameter greater than an external diameter of the tube member). The guide ring 310 may be disposed in parallel with the tube member 100.

According to various exemplary embodiments of the present invention, the guide ring 310 may have a quadrangular cross-sectional shape or other cross-sectional shapes.

In the exemplary embodiment of the present invention illustrated and described above, the example in which the first tube 110 and the second tube 120 have an equal diameter has been described. However, according to various exemplary embodiments of the present invention, the first tube and the second tube may have different diameters.

Figure 4:
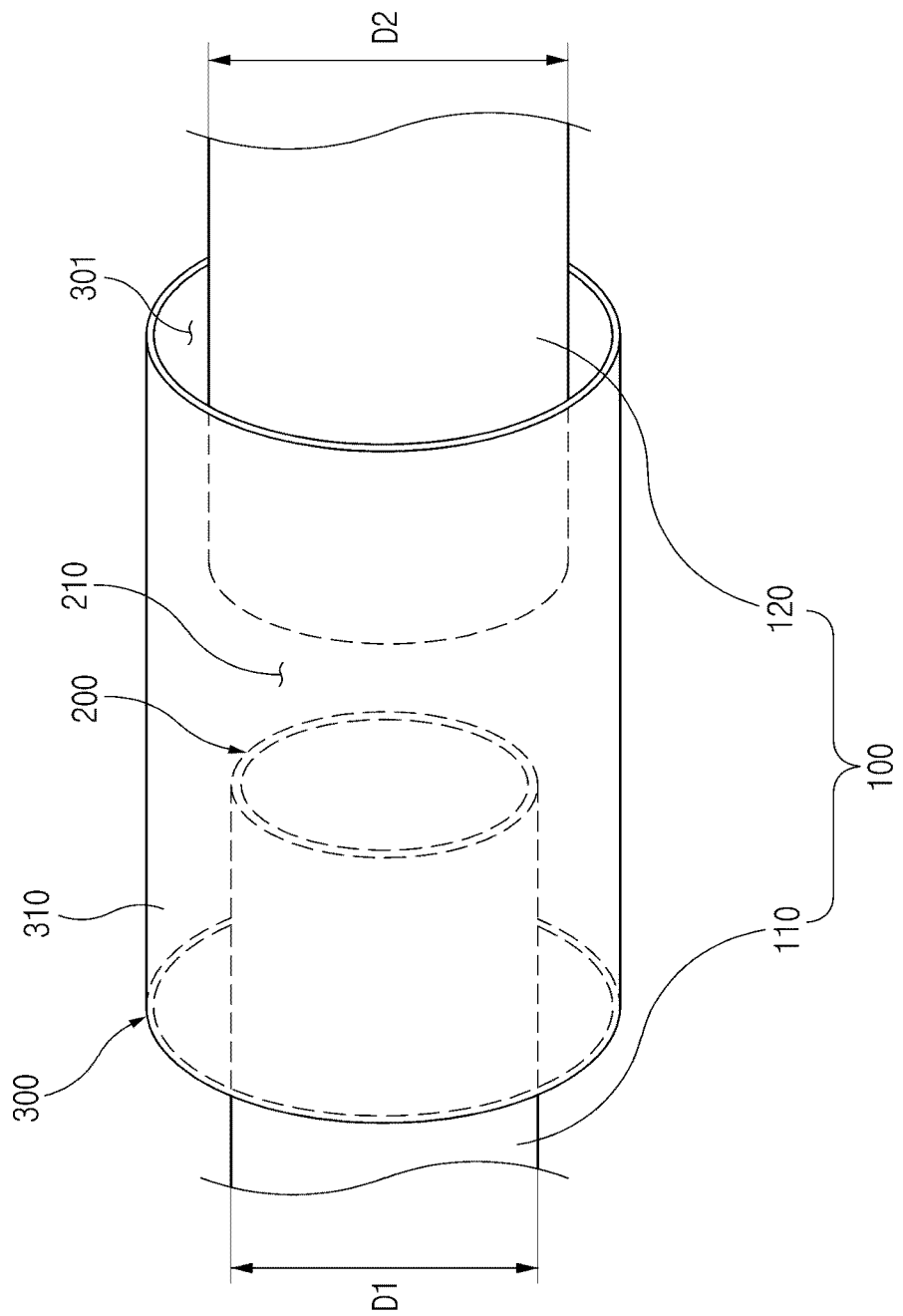
FIG. 4, FIG. 5 and FIG. 6 are views for explaining a modified example of a tube member of the device configured for treating an exhaust gas from a fuel cell according to the exemplary embodiment of the present invention.

For example, referring to FIG. 4, the first tube 110 may be provided to have a first diameter D1, and the second tube 120 may be provided to have a second diameter D2 greater than the first diameter D1 (D2>D1).

In the instant case, a difference between the first diameter D1 and the second diameter D2 may be variously changed in accordance with required conditions and design specifications, and the present invention is not restricted or limited by the difference between the first diameter D1 and the second diameter D2.

Figure 5:
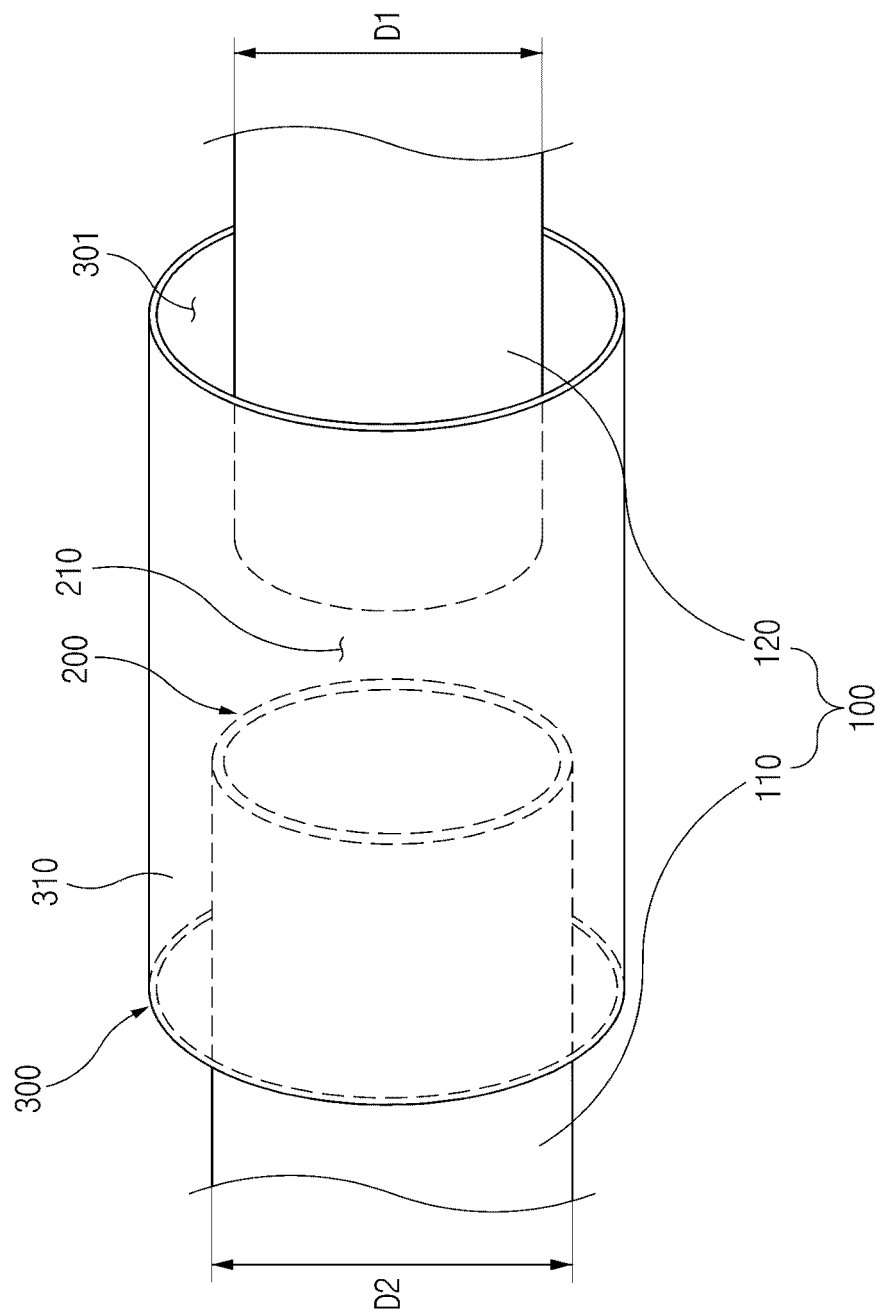

As various exemplary embodiments of the present invention, referring to FIG. 5, the first tube 110 may be provided to have the second diameter D2, and the second tube 120 may be provided to have the first diameter D1 smaller than the second diameter D2 (D1<D2).

Furthermore, in the exemplary embodiment of the present invention illustrated and described above, the example in which the first tube 110 and the second tube 120 are coaxially disposed to have the same center portion has been described. However, according to various exemplary embodiments of the present invention, the first tube and the second tube may be disposed non-coaxially to each other.

Figure 6:
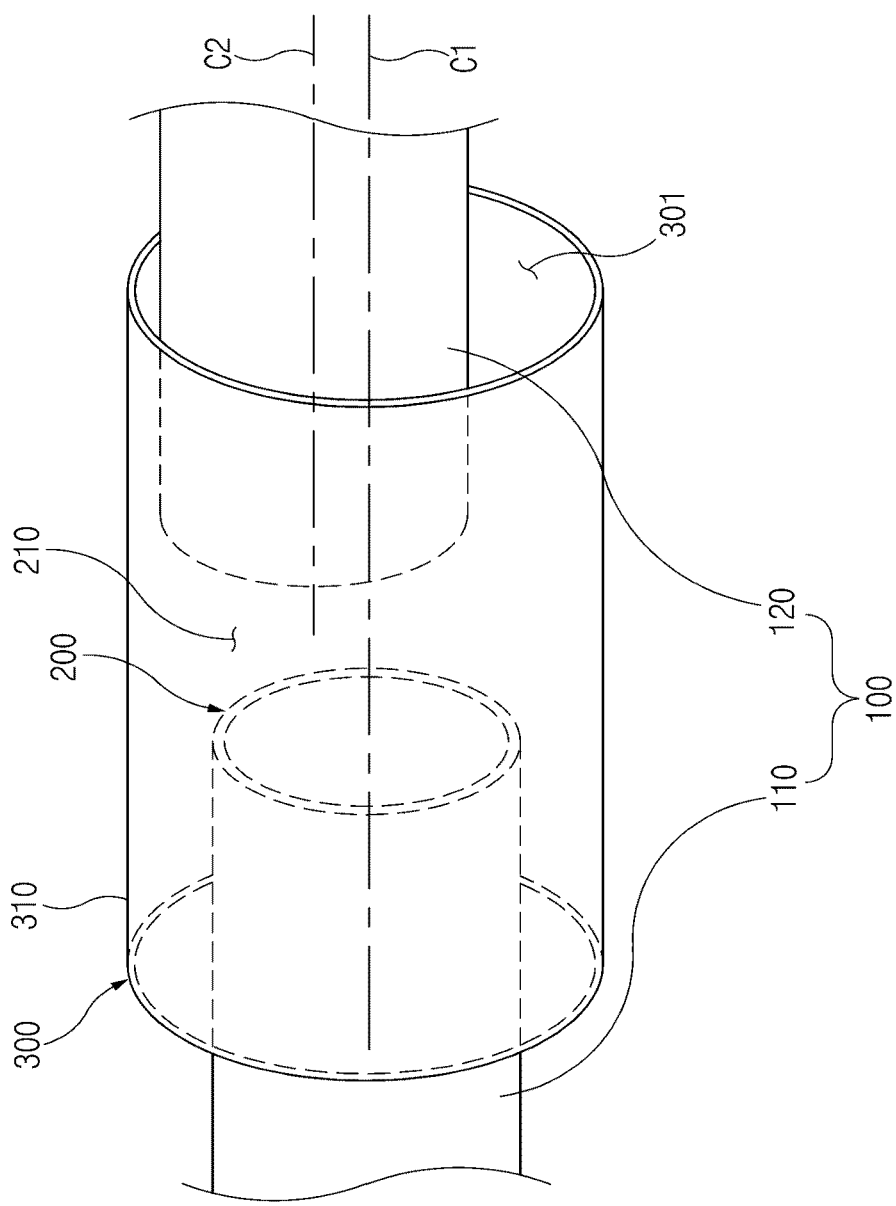

For example, referring to FIG. 6, the first tube 110 and the second tube 120 may be disposed non-coaxially (disposed eccentrically) to have centers C1 and C2 spaced from each other.

In the exemplary embodiment of the present invention illustrated and described above, the example in which the guide tube 300 is disposed in parallel with the tube member 100 has been described. However, according to various exemplary embodiments of the present invention, the guide tube may be disposed to be inclined with respect to the tube member.

Figure 7:
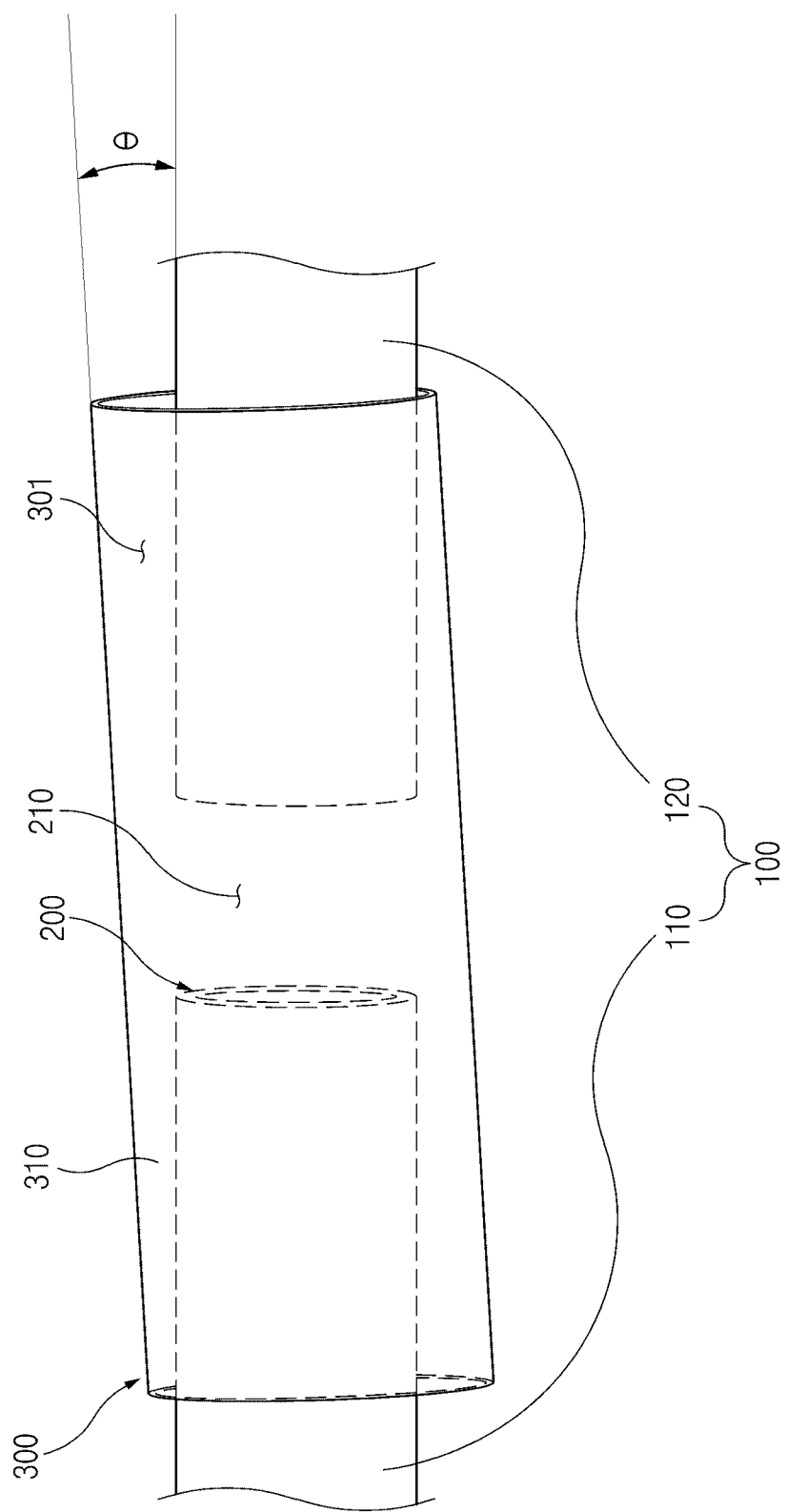
FIG. 7, FIG. 8 and FIG. 9 are views for explaining a modified example of a guide tube of the device configured for treating an exhaust gas from a fuel cell according to the exemplary embodiment of the present invention.

For example, referring to FIG. 7, the guide tube 300 (the guide ring) may be disposed to be inclined at a predetermined angle $\theta$ with respect to the first tube 110 and the second tube 120.

In the instant case, the angle $\theta$ at which the guide tube 300 is disposed with respect to the first tube 110 and the second tube 120 may be variously changed in accordance with required conditions and design specifications, and the present invention is not restricted or limited by the angle $\theta$ at which the guide tube 300 is disposed.

In the exemplary embodiment of the present invention illustrated and described above, the example in which the guide tube 300 (guide ring) is formed in a hollow cylindrical shape having a circular cross section has been described. However, according to various exemplary embodiments of the present invention, the guide tube may be provided in a form of a kind of a trumpet.

Figure 8:
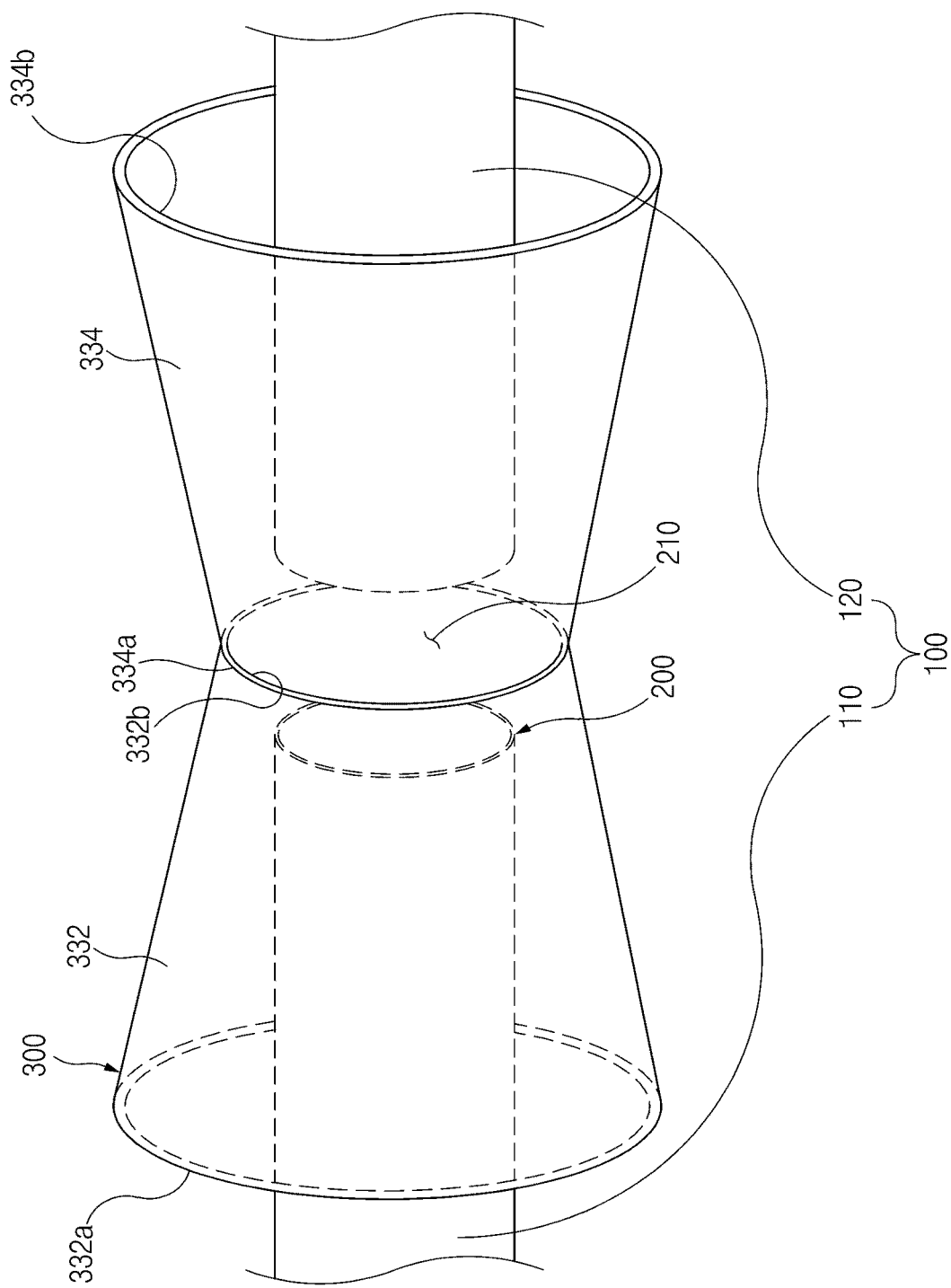

Referring to FIG. 8, according to the exemplary embodiment of the present invention, the guide tube 300 may include a first guide tube portion 332 provided to surround the first tube 110 and having a diameter that gradually decreases from a first inlet 332a to a first outlet 332b, and a second guide tube portion 334 provided to surround the second tube 120 and having a diameter that gradually increases to a second outlet 334b from a second inlet 334a connected to the first outlet 332b.

For example, each of the first guide tube portion 332 and the second guide tube portion 334 may be provided in a form of a trumpet having an approximately trapezoidal cross section. The first guide tube portion 332 and the second guide tube portion 334 may be connected to each other to cooperatively define an hourglass-shaped drum (gourd bottle) shape with an approximately narrow central portion. The connection portion between the first outlet 332b and the second inlet 334a may be positioned around the gas guide slot 210.

For reference, in the exemplary embodiment of the present invention, the example in which the connection portion between the first outlet 332b and the second inlet 334a is positioned on the gas guide slot 210 has been described. However, according to various exemplary embodiments of the present invention, the connection portion between the first outlet and the second inlet may be positioned to be spaced from the gas guide slot (positioned so as not to overlap the gas guide slot in the longitudinal direction of the tube member).

In the exemplary embodiment of the present invention illustrated and described above, an example in which the internal surface of the guide tube 300 (the guide ring) is formed in a straight shape has been described. However, according to various exemplary embodiments of the present invention, the internal surface of the guide tube (the guide ring) may be formed in a curved shape.

Figure 9:
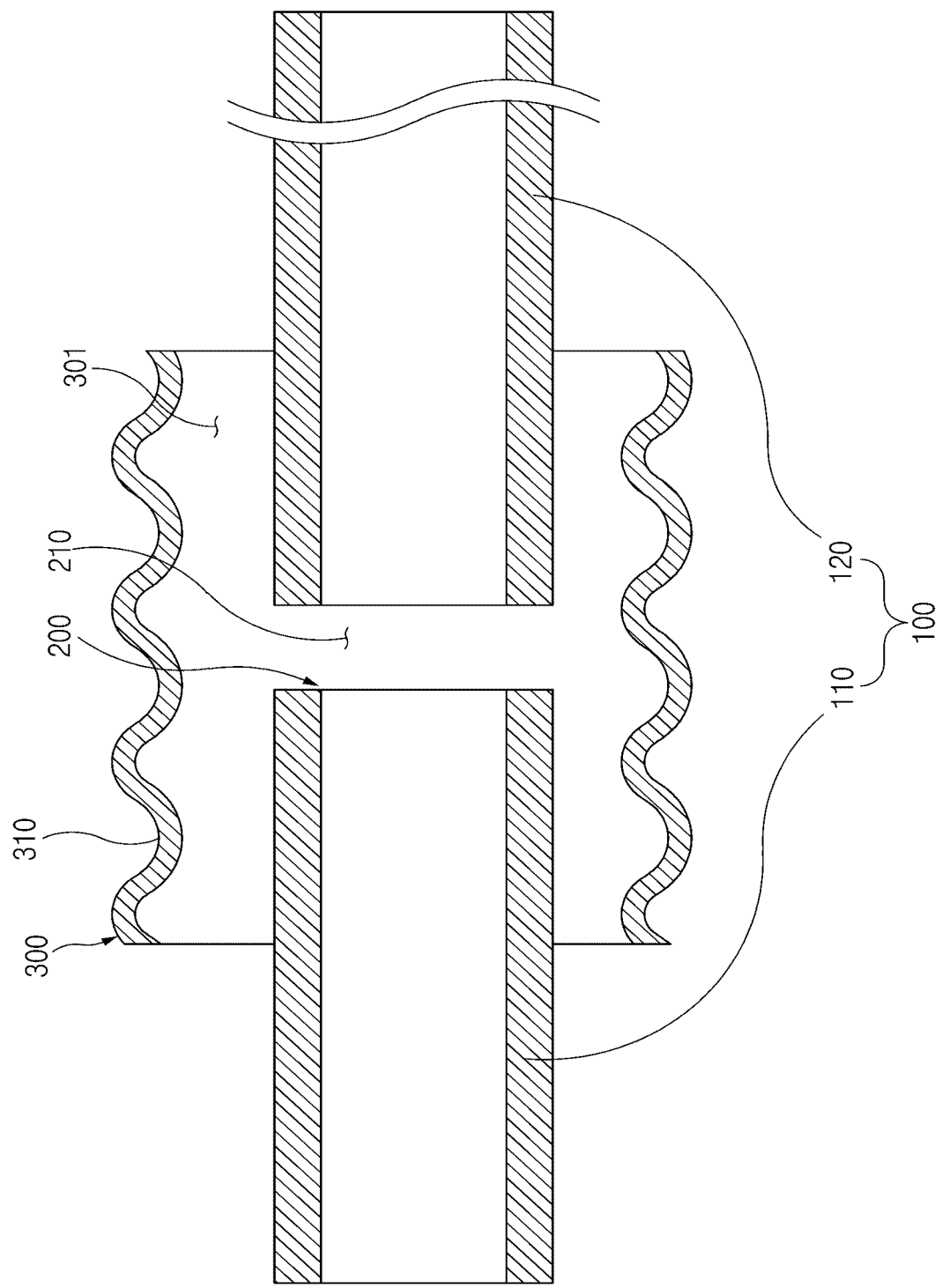

For example, referring to FIG. 9, according to the exemplary embodiment of the present invention, the internal surface of the guide ring 310, which surfaces an external surface of the tube member 100, may be formed to have a regular (or irregular) waveform.

Meanwhile, in the exemplary embodiment of the present invention illustrated and described above, the example in which the gas guide portion 200 includes the gas guide slot 210 has been described. However, according to various exemplary embodiments of the present invention, the gas guide portion may include gas guide holes.

Figure 10:
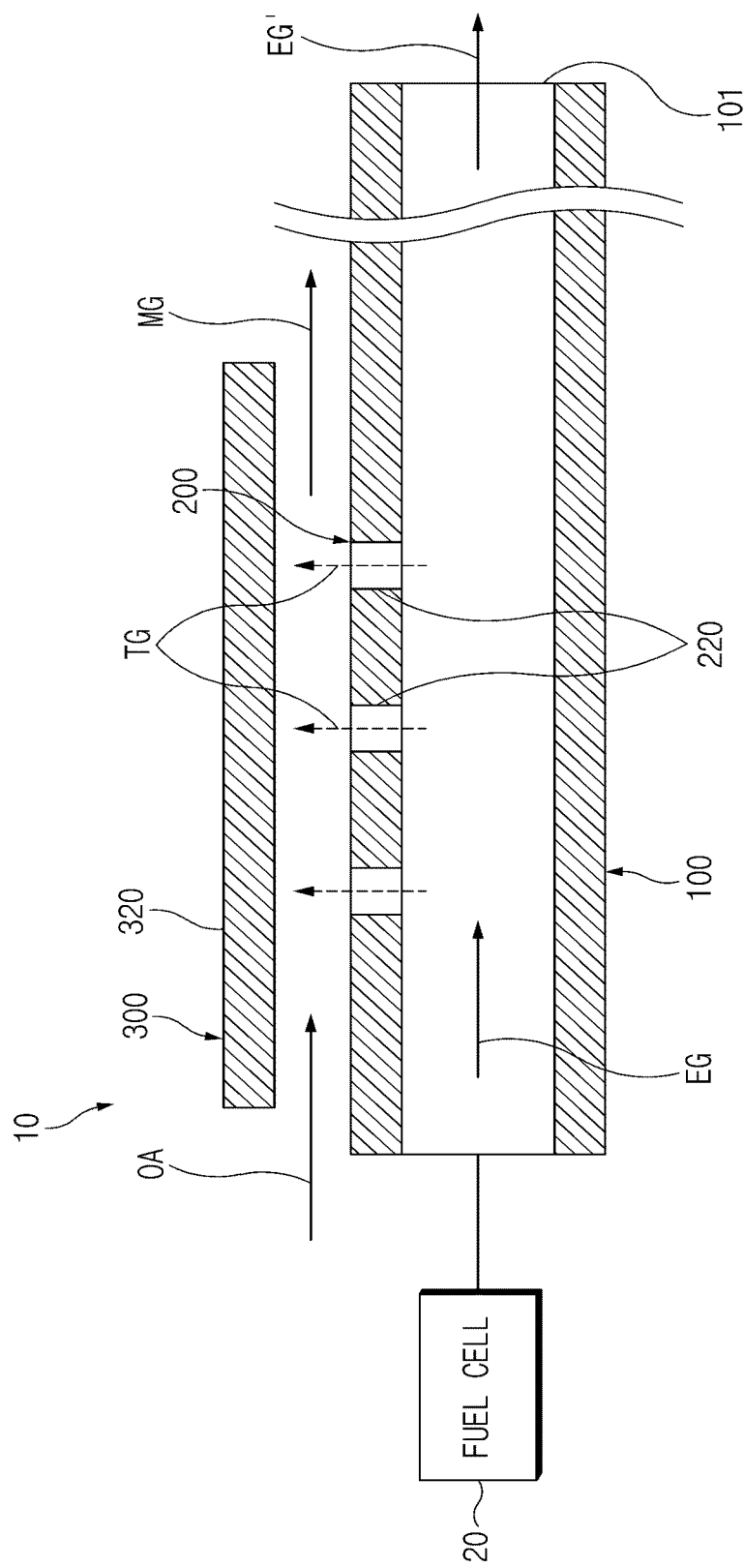
FIG. 10 is a view for explaining another exemplary embodiment of a gas guide portion of the device configured for treating an exhaust gas from a fuel cell according to the exemplary embodiment of the present invention.
Figure 11:
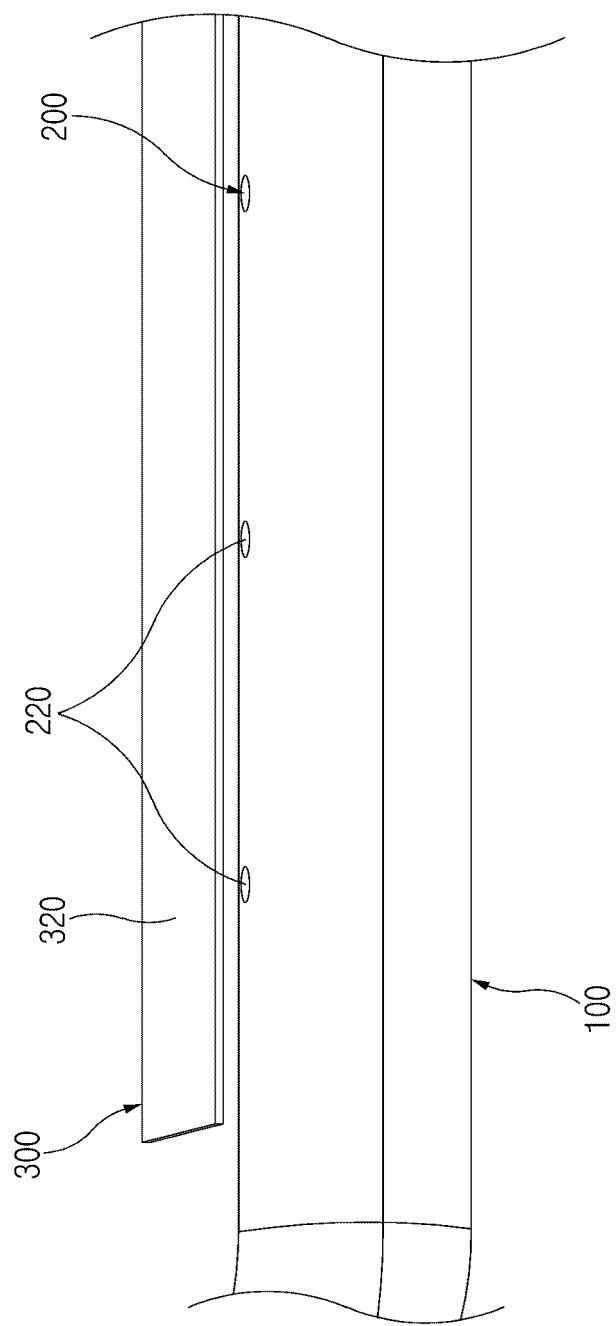
FIG. 11 and FIG. 12 are views for explaining at least a gas guide hole and a guide plate of the device configured for treating an exhaust gas from a fuel cell according to the exemplary embodiment of the present invention.
Figure 12:
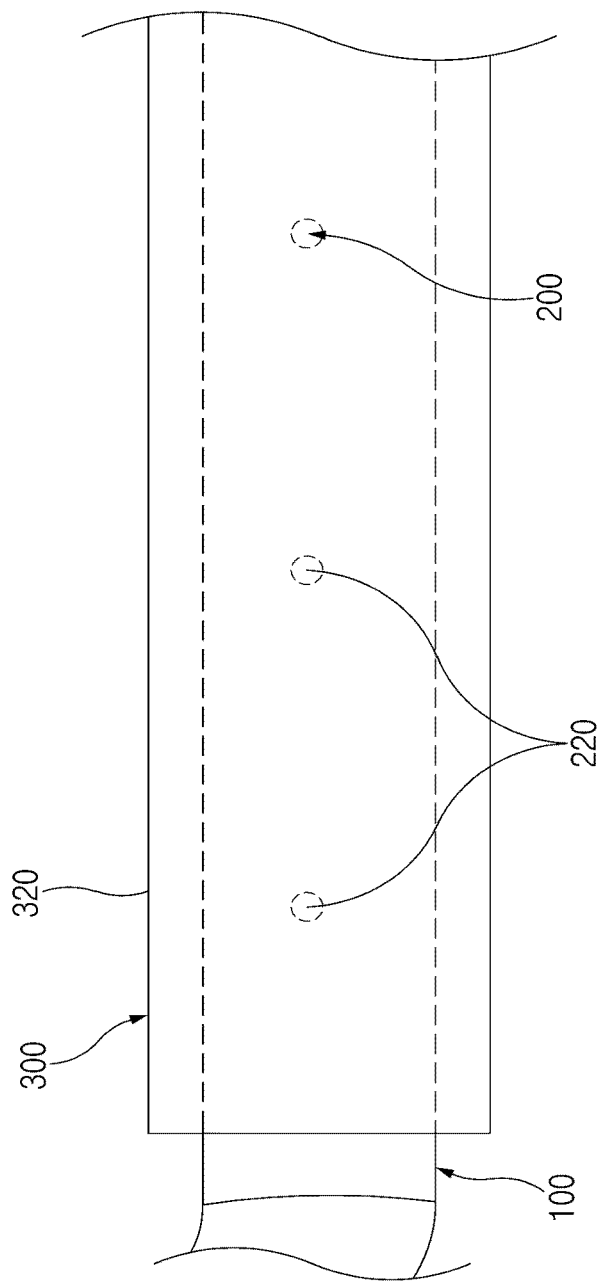

Referring to FIG. 10, FIG. 11, and FIG. 12, according to the exemplary embodiment of the present invention, the device 10 for treating an exhaust gas from a fuel cell may include the tube member 100 configured to discharge the exhaust gas EG from the fuel cell stack 20, the gas guide portion 200 provided in the tube member 100 and configured to guide the target gas TG contained in the exhaust gas EG to the outside of the tube member 100, and the guide tube 300 spaced from the gas guide portion 200 and provided to cover the gas guide portion 200, in which the gas guide portion 200 may include gas guide holes 220 penetratively formed in the tube member 100.

The at least a gas guide hole 220 may have various structures configured for guiding the target gas TG (e.g., hydrogen) to the outside of the tube member 100, and the present invention is not restricted or limited by the structure and the size of the gas guide portion 200 and the number of gas guide parts 200. For example, the three gas guide holes 220 each having a circular shape may be disposed in the tube member 100 to be spaced from one another at predetermined intervals. According to various exemplary embodiments of the present invention, the at least a gas guide hole may be formed in an elliptical shape or other shapes.

For example, the gas guide holes 220 may be formed in an upper portion of the tube member 100 in an upward/downward direction thereof. Otherwise, the gas guide holes 220 may be formed in a lower portion of the tube member 100 in the upward/downward direction thereof, or the gas guide holes 220 may be formed in the upper and lower portions of the tube member 100 in the upward/downward direction thereof, respectively.

Furthermore, according to the exemplary embodiment of the present invention, the guide tube 300 may include a guide plate 320, and the guide plate 320 may be provided to cover a periphery of the at least a gas guide hole 220 (i.e., provided to partially cover the periphery of the tube member).

The mixing space 301 fluidically-communicating with the outside of the tube member is defined between the gas guide holes 220 and the guide plate 320, and the target gas TG and the outside air OA may be mixed in the mixing space 301.

The guide plate 320 may have various structures configured for defining the mixing space 301 in which the hydrogen and the outside air OA may be mixed, and the present invention is not restricted or limited by the structure and the shape of the guide plate 320.

For example, the guide plate 320 may be formed in a straight shape (straight plate shape) configured for partially covering the periphery of the tube member 100, and the mixing space 301, which is opened in all directions, may be provided between the gas guide holes 220 and the guide plate 320.

In the exemplary embodiment of the present invention illustrated and described above, the example in which the guide plate 320 is disposed in parallel with the tube member 100 has been described. However, according to various exemplary embodiments of the present invention, the guide plate may be disposed to be inclined with respect to the tube member.

Figure 13:
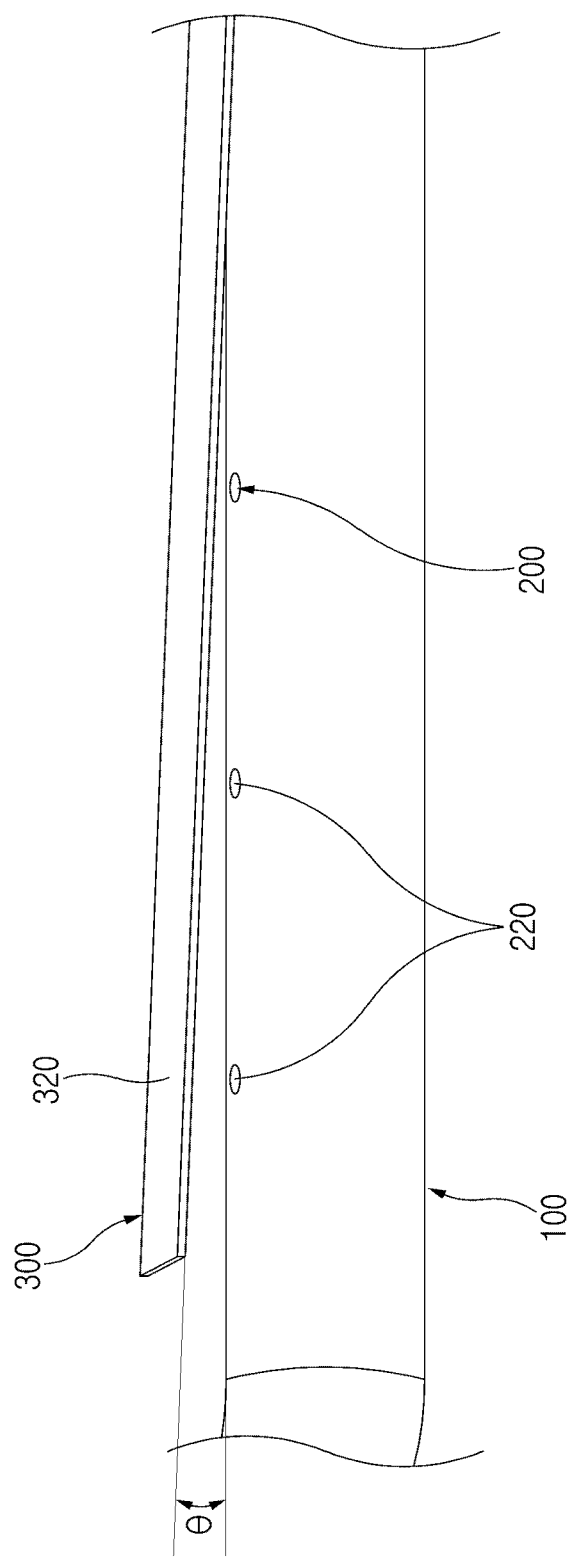
FIG. 13, FIG. 14 and FIG. 15 are views for explaining a modified example of the guide plate of the device configured for treating an exhaust gas from a fuel cell according to the exemplary embodiment of the present invention.

For example, referring to FIG. 13, the guide plate 320 is disposed to be inclined at a predetermined angle θ with respect to the tube member 100.

In the instant case, the angle θ at which the guide plate 320 is disposed with respect to the tube member 100 may be variously changed in accordance with required conditions and design specifications, and the present invention is not restricted or limited by the angle θ at which the guide plate 320 is disposed.

In the exemplary embodiment of the present invention illustrated and described above, the example in which the guide plate 320 is formed in a straight shape has been described. However, according to various exemplary embodiments of the present invention, the guide plate may be formed in a curved shape.

Figure 14:
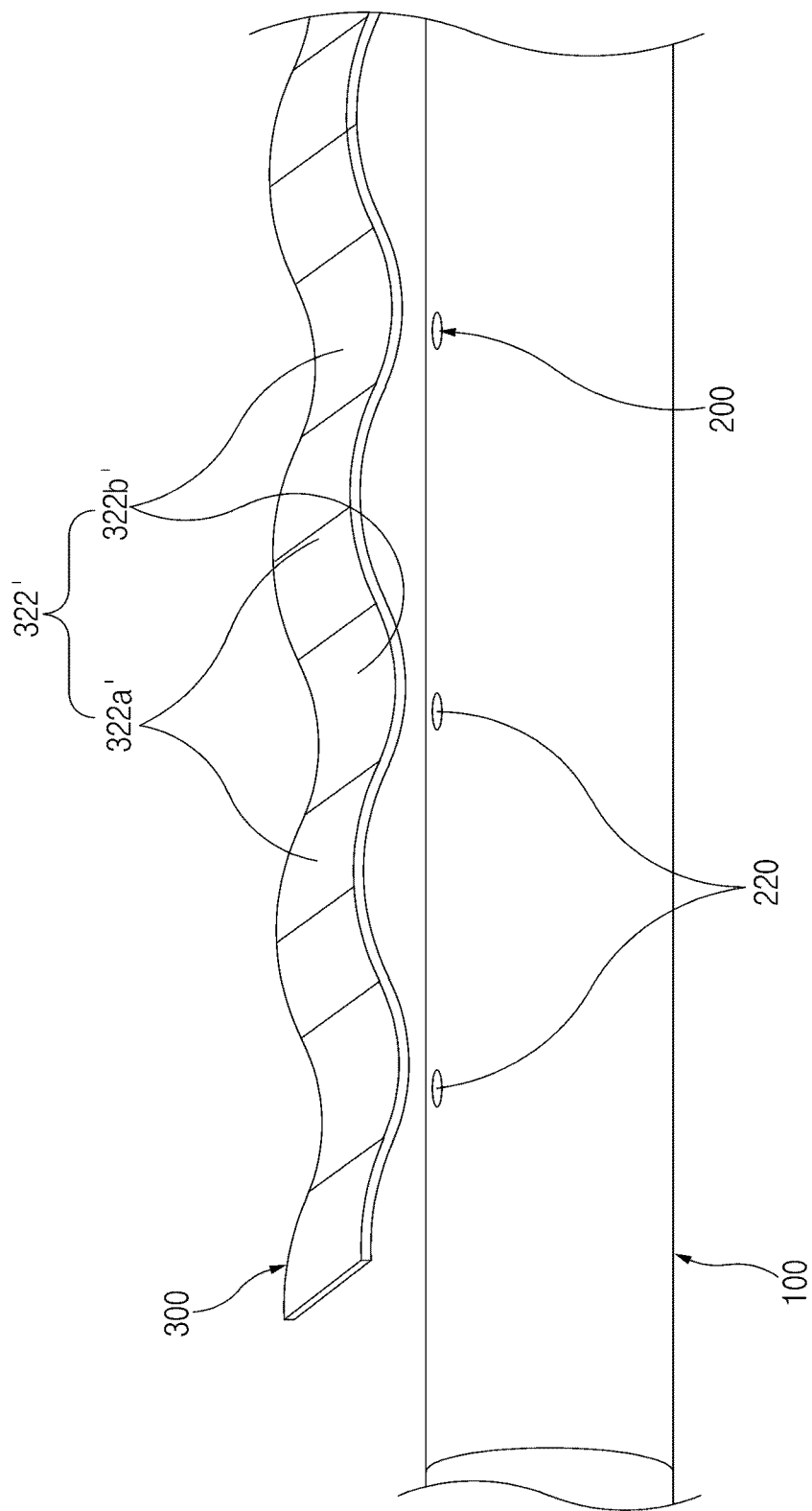
Figure 15:
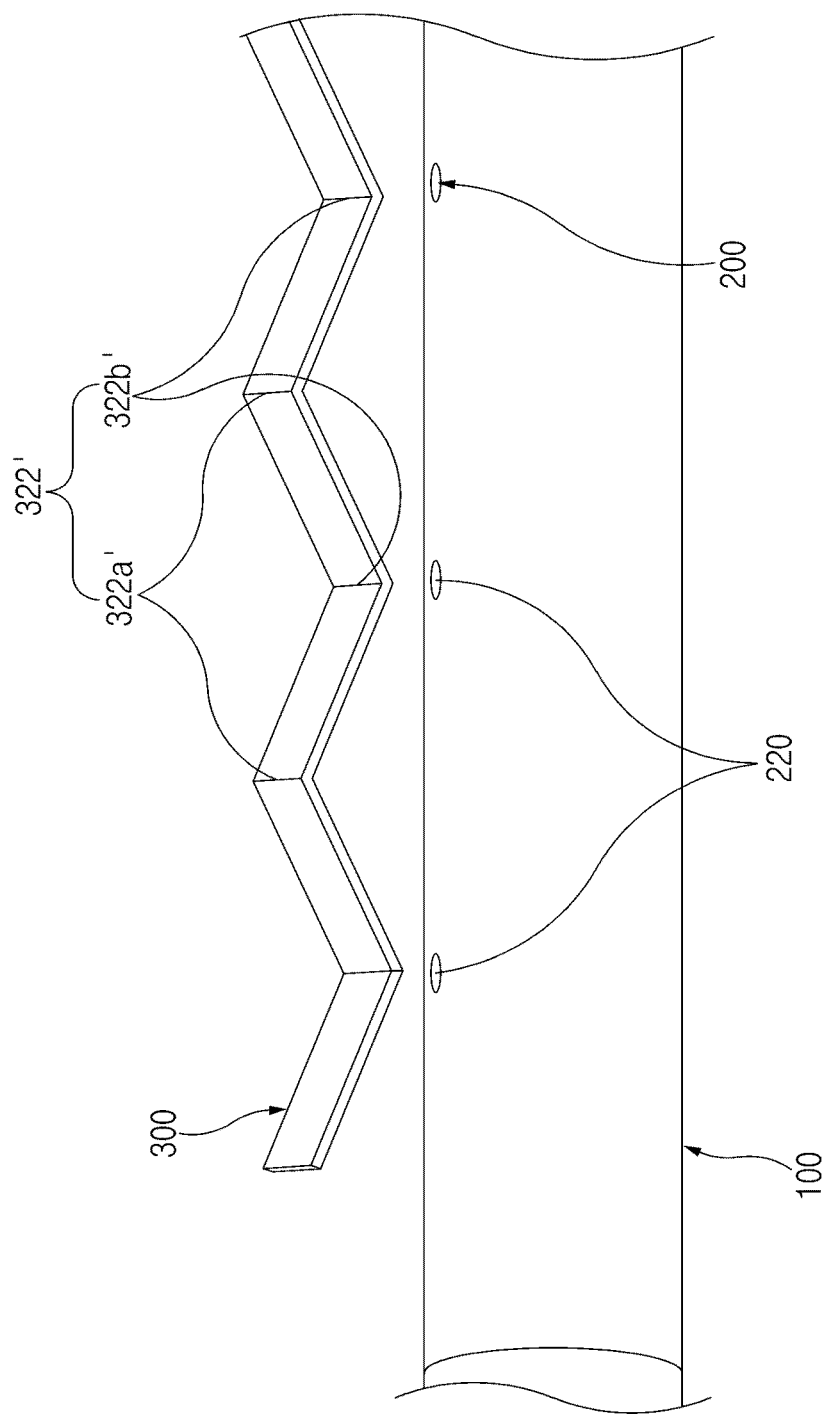

For example, referring to FIG. 14, and FIG. 15, a guide plate 322' may include crest portions 322a' and trough portions 322b' continuously connected to define a waveform.

The crest portions 322a' and the trough portions 322b' of the guide plate 322' may be alternately disposed in the longitudinal direction of the tube member 100, defining a continuous waveform.

Furthermore, a height of the crest portion 322a', a height of the trough portion 322b', and a spacing interval between the crest portions 322a' may be appropriately changed in accordance with required conditions and design specifications, and the present invention is not restricted or limited by the sizes and the structures of the crest portion 322a' and the trough portion 322b'.

For example, referring to FIG. 15, each of the crest portion 322a' and the trough portion 322b' of the guide plate 322' may be formed in a pointy shape. Otherwise, as illustrated in FIG. 14, each of the crest portion 322a' and the trough portion 322b' of the guide plate 320' may be formed in a gradual curved shape.

According to the exemplary embodiment of the present invention as described above, it is possible to obtain an advantageous effect of reducing the concentration of the target gas in the exhaust gas discharged from the fuel cell.

According to the exemplary embodiment of the present invention, it is possible to obtain an advantageous effect of effectively reducing the concentration of hydrogen in the exhaust gas discharged from the fuel cell.

Furthermore, according to the exemplary embodiment of the present invention, it is possible to obtain an advantageous effect of simplifying the structure and improving spatial utilization and the degree of design freedom.

Furthermore, according to the exemplary embodiment of the present invention, it is possible to obtain an advantageous effect of improving safety and reliability.

Furthermore, according to the exemplary embodiment of the present invention, it is possible to obtain an advantageous effect of simplifying the manufacturing process and reducing costs.

Furthermore, according to the exemplary embodiment of the present invention, it is possible to obtain an advantageous effect of ensuring durability of the fuel cell and prolonging the lifespan.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus for treating an exhaust gas from a fuel cell, the apparatus comprising:
    a tube member discharging an exhaust gas from a fuel cell stack;
    a gas guide portion provided in the tube member and guiding a target gas contained in the exhaust gas to an outside of the tube member; and
    a guide tube spaced from the gas guide portion with a first gap and provided to cover the gas guide portion with the first gap,
    wherein the gas guide portion includes a plurality of gas guide holes penetratively formed in the tube member,
    wherein the guide tube includes a guide plate, and the guide plate is provided to cover the plurality of gas guide holes and partially face an outer surface of the tube member, and
    wherein a mixing space opened in all directions is defined between the outer surface of the tube member and the guide plate, and the target gas and outside air are mixed in the mixing space.

2. The apparatus of claim 1, wherein the plurality of gas guide holes is formed in at least one of upper and lower portions of the tube member in an upward direction or a downward direction thereof.

3. The apparatus of claim 1, wherein the guide plate is formed to be straight.

4. The apparatus of claim 1, wherein the guide plate is formed to be curved.

5. The apparatus of claim 4, wherein the guide plate includes a crest portion and a trough portion repeatedly connected to each other to define a waveform.

6. The apparatus of claim 1, wherein the gas guide portion is provided to be spaced apart from a distal end of the tube member.

7. The apparatus of claim 1, wherein first and second distal end portions of the mixing space in a longitudinal direction of the tube member fluidically communicate with the outside.

8. The apparatus of claim 1, wherein the guide tube is disposed to be inclined with respect to the tube member.

9. The apparatus of claim 1, wherein the tube member comprises a single tube.

10. The apparatus of claim 1, wherein the plurality of gas guide holes comprises a plurality of first guide holes formed in an upper portion of the tube member in a vertical direction, and
    wherein the target gas is discharged between the tube member and the guide tube via the plurality of first guide holes.

11. The apparatus of claim 1, wherein the plurality of gas guide holes comprises a plurality of second guide holes formed in a lower portion of the tube member in a vertical direction, and
    wherein the target gas is discharged between the tube member and the guide tube via the plurality of second guide holes.

12. The apparatus of claim 1, wherein the plurality of gas guide holes comprises a plurality of first guide holes formed in an upper portion of the tube member in a vertical direction and a plurality of second guide holes formed in a lower portion of the tube member in the vertical direction,
    wherein a part of the target gas is discharged between the tube member and the guide tube via the plurality of first guide holes, and
    wherein a remaining part of the target gas is discharged between the tube member and the guide tube via the plurality of second guide holes.

* * * * *